United States Patent [19]

Sandrock et al.

[11] Patent Number: 4,839,085
[45] Date of Patent: Jun. 13, 1989

[54] METHOD OF MANUFACTURING TOUGH AND POROUS GETTERS BY MEANS OF HYDROGEN PULVERIZATION AND GETTERS PRODUCED THEREBY

[75] Inventors: Gary D. Sandrock, Ringwood; Winfred L. Woodward, III, Midland Park, both of N.J.

[73] Assignee: Ergenics, Inc., Wyckoff, N.J.

[21] Appl. No.: 126,750

[22] Filed: Nov. 30, 1987

[51] Int. Cl.$^4$ .............................................. C22C 16/00
[52] U.S. Cl. ................................ 252/181.6; 419/30; 419/44; 419/57; 420/422; 420/900; 423/644; 423/658.2
[58] Field of Search ............... 420/422, 900; 423/644, 423/648 R, 658.2; 419/30, 44, 57; 252/181.6

[56] References Cited

U.S. PATENT DOCUMENTS

| | | | |
|---|---|---|---|
| 2,784,084 | 3/1957 | Marsh et al. | 420/422 |
| 3,018,169 | 1/1962 | Vetrano | 23/204 |
| 3,150,972 | 9/1964 | Rosler | 420/422 |
| 3,425,116 | 2/1969 | Crooks et al. | 420/422 |
| 3,620,645 | 11/1971 | Porta et al. | 252/181.6 |
| 4,269,624 | 5/1981 | Figini | 420/422 |
| 4,312,669 | 1/1982 | Boffito et al. | 420/422 |
| 4,360,445 | 11/1982 | Mendelsohn et al. | 252/181.6 |
| 4,383,606 | 5/1983 | Hunter | 423/648 R |
| 4,389,239 | 6/1983 | Klatt et al. | 423/648 R |
| 4,440,737 | 4/1984 | Libowitz et al. | 252/181.6 |
| 4,555,395 | 11/1985 | Sirovich et al. | 423/648 R |
| 4,586,561 | 5/1986 | Franco et al. | 252/181.6 |
| 4,621,417 | 11/1986 | Mohrl et al. | 423/644 |
| 4,629,720 | 12/1986 | Suzuki et al. | 423/648 R |

FOREIGN PATENT DOCUMENTS

| | | | |
|---|---|---|---|
| 108016 | 9/1978 | Japan | 420/422 |
| 91736 | 6/1982 | Japan | 420/900 |
| 16046 | 1/1983 | Japan | 420/900 |

OTHER PUBLICATIONS

C. Boffito et al, "Nonevaporable low temperature activatable getter material," *J. Vac. Sci. Technol.*, 18(3), Apr. 1981, pp. 1117–1120.

N. A. Galaktionowa Hydrogen-Metal Systems Data Book, Apr. 18, 1981 pp. 96–101.

William M. Muller, James P. Blackledge & George G. Libowitz Metal Hydrides, Academic Press, 1968 pp. 1–20.

Primary Examiner—John Doll
Assistant Examiner—Wayne A. Langel
Attorney, Agent, or Firm—Charles E. Baxley

[57] ABSTRACT

A method of manufacturing high-zirconium getters that involves hydrogen pulverization of an entire alloy ingot or ingot pieces. The method offers distinct advantages over techniques that use mechanical means of powder production. The method is useful expecially in the manufacture of tough porous getters, of high Zr-content Zr-V alloys that have minor additions of elements such as Fe, Ni, Mn and/or Al.

28 Claims, 5 Drawing Sheets

METHOD OF MANUFACTURING TOUGH AND POROUS GETTERS BY MEANS OF HYDROGEN PULVERIZATION AND GETTERS PRODUCED THEREBY

This invention relates to a method of manufacturing tough and porous metallic getters as well as the getters produced thereby. In particular, the invention relates to manufacture of nonevaporable getters containing high levels of zirconium, along with vanadium and other elements, that are not crushable by conventional mechanical means.

BACKGROUND OF INVENTION

Nonevaporable getters are porous metal structures that are used widely for vacuum maintenance and for purification of inert gasses. Getters operate by means of strong surface chemisorption of reactive gasses, for example $H_2$, CO, $CO_2$, $H_2O$, $O_2$, $N_2$, etc. In the case of $H_2$, in addition to dissociative surface chemisorption, H atoms actually enter metal crystal lattices to form interstitial solutions and often hydride phases. For all other reactive gasses, gettering reactions are limited largely to metal surfaces, at least at near ambient temperatures. Therefore, from reactivity and capacity points of view, it is a desirable feature that getter structures be porous and have high surface areas. This feature means that getters are made almost universally by powder metallurgy processes. In addition it is important usually that getter structures be tough mechanically so as to resist breakage and particulation during rough service. Ease of making powder usually requires alloy brittleness; conversely, a getter structure requires a degree of alloy toughness. As will be seen, it is one of the objects of this invention to avoid this apparent metallurgical dilemma.

Alloys and intermetallic compounds based on the elements zirconium and vanadium have been shown to have desirable gettering properties. In 1966, Pebler and Gulbransen, in an article published in ELECTROCHEMICAL TECHNOLOGY, Vol. 4, No. 5–6, pp. 211–215, showed that the intermetallic compound $ZrV_2$ had good room temperature solubility for hydrogen. Later, in 1979 U.S. Pat. No. 4,163,666, Shaltiel, Davidov, and Jacob disclosed the $H_2$ gettering potential of Fe substituted versions of $ZrV_2$, i.e. intermetallic compounds of the general formula $Zr(V_{1-x}Fe_x)_2$. The above-mentioned intermetallic compounds apparently are brittle and easily grindable by mechanical means into powder, but as mentioned above a brittle material would not be expected to allow manufacture of a tough sintered structure. Also the vanadium contents of these materials are high, 26 to 53 wt. % V. In the case of $H_2$ gettering, increasing V levels in Zr-V alloys tends to lower undesirably the saturation level at some given temperature and pressure. Also increasing V levels increase raw materials costs. Thus it would be desirable to minimize V content and maximize Zr content.

One attempt to achieve the foregoing objective was reported by Mendelsohn and Gruen in 1982 U.S. Pat. No. 4,360,445. Those inventors prepared oxygen stabilized compounds containing for example Zr, V and Fe, among others. A particular example shown was $Zr_{1.4}V_{0.5}Fe_{0.5}O_{0.25}$. While this compound contains only about 14 wt. % V and 69 wt. % Zr, it contains a rather large amount of Fe (15 wt. %), which the inventors say "increases the brittleness to permit fracturing and powdering of the alloy". Because Fe has a low affinity for hydrogen, large amounts of Fe would be expected undesirably to decrease hydrogen gettering ability. In fact the hydrogen capacities for the aforementioned Oxygen stabilized compounds are not particularly high at low pressure.

The heretofore most successful approach to Zr-V type getters was reported by Boffito, Barosi and Figini in 1982 U.S. Pat. No. 4,312,669. These inventors patented a family of Zr-V-Fe ternary gettering alloys. The most prominent of these alloys is, by weight percent, 70Zr-24.6V-5.4Fe, which has been sold successfully under the Trademark St-707 by SAES Getters S.p.A of Milan, Italy. According to a 1984 paper by Boffito, Doni and Rosai, published in the JOURNAL OF LESS-COMMON METALS, Vol. 104, pp. 149–157, this alloy consists of the phases $Zr(V_{0.83}Fe_{0.17})_2$ and $\alpha$-Zr. That is, the alloy family is considerably more rich in Zr than the $Zr(V,Fe)_2$ intermetallic which results in better $H_2$ and $H_2O$ gettering characteristics. In addition the presence of ductile $\alpha$-Zr phase helps to increase mechanical toughness. However, U.S. Pat. No. 4,312,669 limits Zr content to no more than 75 wt. % because the alloy "could become too plastic creating difficulties in its transformation into a fine powder". Additionally, in a 1981 patent (U.S. Pat. No. 4,269,624) on the manufacture of such ternary gettering alloys, Figini disclosed conventional melting followed by mechanical grinding (ball milling) with all examples and claim such that the Zr contents are equal to or less than 75 wt. %. Thus all prior art of which we are knowledgeable, suggest that practically it is not possible by prior art methods to produce powder for the manufacture of Zr-V type gettering alloys wherein the Zr content is greater than 75 wt. %.

The aforementioned grindable St-707, 70Zr-24.6V-5.4Fe alloy can be made stronger in final getter form by mixing elemental Zr powder with the pre-ground alloy powder before final sintering, as described in a brochure entitled St 172 ADVANCED POROUS GETTERS published May, 1987, by SAES Getters S.p.A. This strengthening is helpful but retains certain disadvantages. First, in our experience such mechanical mixtures of powder do not result in as strong sintered structures as when the increased Zr level is incorporated metallurgically during the original alloy melting, as is the case for the present invention. This may be a desired result of the more intimate mixture of phases that can occur during melt alloying versus mechanical blending. Second, elemental Zr powder is much more expensive than bulk Zr sponge which is added during original alloy melting. Third, the Zr blending procedure represents an extra production step which must be done carefully in an inert atmosphere, because of potential powder flammability.

As will be shown, this invention eliminates completely the problem of making fine powder from high Zr gettering alloys, especially those of the Zr-V type where Zr is greater than 75 wt. %, i.e. those alloys that cannot be pulverized practically by mechanical means. We have found such alloys can be pulverized conveniently by simple and direct reaction of the metal ingot, or ingot pieces, with hydrogen gas, resulting in hydrogen absorption, alloy embrittlement, hydride formation, and crystal lattice expansion, all of which in sum result in spontaneous decrepitation of the entire ingot into powder and/or small granules. The hydrogen so introduced can be largely removed subsequently by vacuum/thermal means to result in low hydrogen alloy powder for use in the manufacture of sintered porous getters or used directly for gettering purposes.

It is well known that hydriding, followed by grinding, followed by dehydriding is commonly used to produce powders of some normally ductile pure elements such as Ti and Zr. In the case of Zr, for example, substantial mechanical grinding of the Zr hydride must be performed before the dehydriding step. Also high temperatures are required to hydride Zr. Conversely the gettering alloys used in this invention require neither elevated temperatures to hydride nor significant grinding to produce powder. These alloys react directly with $H_2$ at room temperature and spontaneously form powder. Although hydride/dehydride techniques have been used to make Sm-Co and Nd-Fe-B magnet alloy powders, these techniques have not been used to manufacture Zr getter powders from alloys that are too tough to grind by conventional mechanical means.

OBJECTS OF THE INVENTION

It is a principal object of this invention to provide improved getter manufacture that involves pulverization of alloys that cannot be ground by conventional means.

It is another object of this invention to provide a family of ternary and quaternary alloys that are suitable for the processing method here involved and result in improved gettering properties in product form.

It is another object of this invention to provide a method of making gettering alloy powder with improved shape and increased surface area.

It is another object of this invention to provide a method of making getter powder that results in greater cleanliness and purity than is possible by conventional mechanical grinding techniques.

It is another object of this invention to provide a method of getter powder production that is safer than conventional milling techniques.

It is another object of this invention to provide a method for making porous sintered getters with improved mechanical toughness.

It is another object of this invention to provide a method of getter manufacture that optionally results in contained hydrogen that can be released advantageously during activation.

Other objects will appear from a description, drawings, examples and claims all of which follows.

DESCRIPTION OF THE INVENTION

This invention can be described best in a series of manufacturing steps, some of which are mandatory and some of which are optional:

Step 1: Composition Selection

The alloys concerned with this invention consist in the broadest sense of levels of Zr from 65 to 90 wt. %, V from 10-35 wt. %, and one or more of the following elements E in total content up to 7 wt. %: Fe, Ni, Mn, Al. Preferred levels are Zr greater than about 75%, V less than about 20%, and E less than about 5%. All compositions within the broad range serve as excellent getters when manufactured by the method subsequently to be described. The preferred alloys cannot be pulverized easily by mechanical means, but they provide generally better gettering properties. However, the best composition depends on the getter application intended. The compositions of the invention should really be considered a broad family. The inclusion of elements E is important, as will be shown in the examples, for facilitating the manufacturing steps of the invention as well as improving gettering properties. Also in the cases of Fe and Al, a vector is provided for the addition of the element V in the form of the low-cost V-Fe ferroalloy or the V-Al masteralloy.

Step 2: Alloy Melting

The alloys concerned with this invention should be prepared in ingot form by conventional metallurgical melting techniques, for example consumable or nonconsumable electrode arc melting or induction melting under vacuum or inert gas. Water-cooled copper crucibles are preferred. Because of melt reactivity, oxide crucibles should not be used. Raw materials can be either commercially pure elements or ferroalloys and masteralloys as mentioned above.

Step 3: Hydrogen Pulverization

The ingot produced in Step 2 now is ready for hydrogen pulverization. If it is clean and oxide free the ingot needs no further preparation. If there is a significant oxide film on the surface it is useful to clean the ingot by sandblasting or grinding to the metal substrate to provide an easy path for hydrogen entry and minimize the presence of oxide impurities in the final getter product. The entire ingot, or some desired portion thereof, is placed in a container with provision for hermetic sealing. The container should be of a suitable material such that hydrogen embrittlement of said container is not possible. Austenitic stainless steel is preferred. It is important that at least 60% void space, in addition to the ingot, be provided because the getter alloy will expand substantially during subsequent $H_2$ absorption. The container is sealed and the contained air removed carefully from the void space of the container by purging with an inert gas such as argon or helium or, preferably, by pumping it out with a vacuum pump capable of achieving an ultimate vacuum of less than 100 millitorr. The inert gas purge or pumping then is discontinued and commercial purity hydrogen gas introduced into the vessel. This $H_2$ introduction can be performed at room temperature to any convenient pressure ranging from 0.1 to 10 atmospheres absolute. For safety sake, in case the vessel may be capable of accidental air in leakage, it is preferable that the $H_2$ pressure be maintained at more than 1.0 atmosphere absolute (760 absolute torr). After an incubation time ranging from less than a minute to more than an hour, depending on alloy composition and $H_2$ pressure, the hydrogen begins to absorb into the ingot. As the $H_2$ is absorbed the alloy suffers hydrogen embrittlement, hydride phase formation, and expansion of the crystal lattices with the overall result of the solid ingot spontaneously fragmenting into powder and/or small granules. The sound of this pulverization process usually can be heard clearly through the walls of the vessel in the form of popping and crackling. In addition, the absorption of hydrogen is strongly exothermic and it will be noticed that the container will begin to heat rapidly. If uncooled, the container can reach a temperature of several hundred degrees Celsius. For maximum rate of $H_2$ absorption, it is desirable that this heat be removed, for example by forced air or water cooling of the reaction vessel. As the $H_2$ is absorbed, more should be fed into the reaction vessel preferably from a gas cylinder through a demand pressure regulator set at the desired pressure of reaction. The quantity of hydrogen absorbed can be monitored by observing reduction of pressure in the supply cylinder. $H_2$ charging should be continued until the ingot absorbs from 0.006 to 0.011 mols $H_2$/gram at which time the ingot will be well pulverized.

The $H_2$ pulverization method that is the key to this invention has several advantages over mechanical means of crushing and grinding, such as jaw crushing, roller crushing, ball milling, and the like. First of all, this invention allows pulverization of high Zr alloys that, for high ductility or toughness reasons, simply cannot be crushed and ground by mechanical means. In addition, even for Zr-V type alloys of lower Zr content which can be crushed and ground by conventional means, this invention offers advantages. Said alloys can easily ignite and burn, if attempts are made mechanically to crush or grind them in air. Therefore, for safety and for preventing loss of product, it is imperative that all mechanical grinding be done in an inert atmosphere such as argon. Even so, air inleakage during crushing and grinding can result in formation of oxides and nitrides of Zr, in effect reducing cleanliness and quality of the getter powder product. In addition, conventional grinding processes such as ball milling result in further undesirable contaminants from erosion of the grinding medium, e.g. metal or ceramic particles form the grinding balls. Furthermore, mechanical grinding can result in surface burnishing of particles which burnishing may be undesirable for subsequent processing steps or ultimate gettering properties. Hydrogen pulverization eliminates all of these potential problems. The process is not mechanical and is performed in a protective $H_2$ environment so that extremely clean getter powder results, virtually free of chemical or particulate contaminants. In addition, $H_2$ pulverization results in a more flakelike morphology than does mechanical grinding. From a gettering point of view, hydrogen pulverization is desirable because it yields a high surface area per unit mass of powder, thus resulting in improved gettering properties in the sintered getter product. The particle size of the $H_2$ pulverized powder can be influenced by the amount of $H_2$ charged into the ingot during fragmentation. The higher the amount of $H_2$ charged, the finer is the resultant powder. Repeated hydride/dehydride cycling can result in further particle size reduction, if desired. However, it is more practical usually to perform a limited amount of mechanical grinding to obtain desired particle size range as described in Step 5.

Step 4: Air Stabilization (Optional)

Because the hydrided powder produced by Step 3 is, depending on composition and particle size, potentially pyrophoric or flammable, it is recommended that size classification and any further grinding that may be desired (Step 5) be done in an inert atmosphere, in which case this step is not strictly required. This recommendation is especially pertinent with the Al or Mn containing compositions of this invention which tend to be more pyrophoric. However, it may in certain circumstances be desirable to handle or store hydrogen containing powder or granules in air. If so, the powder must be stabilized against spontaneous pyrophoricity that may occur on sudden exposure to air.

The process of air stabilization starts after completion of Step 3 by briefly pumping or purging the gaseous $H_2$ remaining in the hydrogen reaction vessel. Some hydrogen tends also to leave the powder material and a little endothermic cooling below room temperature may be noted. The evacuated vessel then is backfilled with air, slowly over a period of about a minute. The oxygen fraction of the air will be chemisorbed on the surface of of the hydride powder and some modest rise in temperature may be noted. Within a few seconds to a few minutes the atmosphere virtually will be depleted of oxygen, i.e. will be essentially all $N_2$ and Ar. This residual gas should be pumped out and the vessel again backfilled with air. This procedure should be repeated several times until there is no further significant temperature rise in that portion of the powder bed that is farthest from the air inlet. The hydride powder now is considered to be passivated by oxygen (air stabilized) and the reaction vessel can be opened to air and the powder contained therein can be removed, still with appropriate caution. The operator should always remember that the hydride powder is potentially flammable and so due care should always be taken with all handling and processing thereof in air.

Step 5: Size Classification and Further Grinding

The powder and granules produced by Step 3 are screened or gas classified into particle size ranges desired for a particular intended getter product. If Step 3 has resulted in a component of particles that are coarser than desired, further particle size reduction can easily be achieved by light mechanical grinding, using for example a motor or hand driven mortar and pestle. Because the granules are largely in hydride form at this stage, it will be noticed that they are highly brittle and often partially cracked, so that simple light mulling or tumbling usually will result in significant further particle size reduction. Again for safety and minimum product loss it is recommended highly that both size classification and grinding (if any) be performed in a substantially inert gas atmosphere. By inert gas we mean the noble gasses He, Ne, Ar, Kr, and Xe, with Ar being the most practical and economical choice. $N_2$ and $CO_2$ should not be considered inert gasses because Zr alloy powders can burn in these gasses.

Step 6: Hydrogen Bakeout (Optional)

After Step 5 it is usually desirable to remove most of the hydrogen present in the powder before getter fabrication and final sintering so as to minimize $H_2$ evolution during the last sintering step. However, in some cases it is possible to proceed to the final sintering step with fully hydrogen charged powder, so this preliminary hydrogen removal step should be considered optional.

Hydrogen removal is accomplished by loading the hydride powder from Step 5 into a vacuum tight vessel, applying a dynamic vacuum by means of a mechanical vacuum pump, and heating the vessel and/or powder therein. The hydrogen is desorbed and pumped away by the vacuum pump. In the absence of a vacuum pump a flowing inert gas can be used optionally to carry away the desorbed $H_2$. The powder should be heated to 700°-850° C. and evacuation or inert gas purging continued until the equilibrium $H_2$ partial pressure is reduced to preferably below 1 torr at the bakeout temperature. Depending on the quantity of powder being degassed, the powder particle size, pump size and pumping impedance factors, this process can require up to several hours. After completion of the bakeout the vessel should be isolated from the vacuum pump and allowed to cool.

It should be noted carefully that this step is not intended to remove all the $H_2$ introduced in Step 3. For example, typical powder baked to a pressure of about 1 torr at 800° C. still retains up to 3-5% of the hydrogen introduced in Step 3, i.e. up $5 \times 10^{-4}$ mols/g or 8 torr-liters/g. As will be discussed later, this residual $H_2$ can be used advantageously during final sintering.

As a safety consideration, it should be noted also that the copious quantities of $H_2$ evolved during this processing step should be disposed of carefully, either by burning at the exit of the vacuum pump or venting. In production practice, it is possible to capture and reuse this $H_2$, for example by using a hydrogen/metal hydride compressor of the kind manufactured by Ergenics, Inc. of Wyckoff, N.J.

Step 7: Air Stabilization

The degassed powder resulting from Step 6 should be considered potentially pyrophoric if suddenly exposed to air. Therefore, the air stabilization described in Step 4 should be performed at this point.

Step 8: Mulling

The degassed powder resulting from Step 6 may have become sintered very lightly into soft lumps. It is usually desired that the powder be flowable so that a light mulling or tumbling is performed followed by screening to the approximately original powder size after Step 5. Again, it is preferred that this be done in a substantially inert gas environment.

Although it is the principal intent of this invention to cover manufacture of sintered getters, it is quite possible to use the low hydrogen getter powder or granules produced thus far for gettering purposes in the unsintered condition, i.e. skipping the next Step, and this teaching should also be considered within the scope of the present invention.

Step 9: Forming and Sintering

The getter powder produced by the method described above now is fabricated into final getter products. First, the powder is formed into a desired shape, for example, by pressing in a die of desirable shape or by packing into a mold of suitable internal shape. In order to produce desirable mechanical strength, the "green" powder form should be sintered at a temperature higher than used in Step 6, but no so high that melting occurs and the porosity inherent in a sintered powder product is lost. Depending on alloy composition and powder particle size, useful sintering temperatures cover the approximate range 900°-1200° C. In order to avoid damage or destruction of the getter powder and promote effective sinter bonding, sintering should be done in a vacuum or inert gas environment such that the effective partial pressure of all non-inert gasses, excluding $H_2$ preferably is less than $10^{-5}$ torr. After sintering, the getters are cooled to room temperature in the process vacuum or inert gas, after which they can be exposed to air and are ready to be used as getters.

The small amount of hydrogen left in the getter powder after Step 6 usually is removed to virtually zero level during the final high temperature sintering step. Outgassing of this $H_2$ during the final sintering step is believed to be beneficial in helping clean the getter surface and helping to keep undesirable residual gasses, such as $H_2O$ vapor and vacuum pump oils, away from the getter. In practice, we encase the getters with a loosely fitting Zr-foil envelope during sintering to increase residence time of the protective $H_2$.

In some applications it may be desirable to leave a small amount of hydrogen in the finished getter, for example on the order of 10-500 cc-torr $H_2$, for beneficial release during the activation step the getter user performs when manufacturing his gettered device. Activation usually consists of heating the getter under vacuum in situ in the near finished device. $H_2$ may be useful in helping clean device surfaces of undesirable adsorbed species. For example, carbon or heavy hydrocarbons can be converted to light, gaseous (pumpable) hydrocarbons such as $CH_4$ by reaction with $H_2$. Also, the evolution of $H_2$ during activation is believed to be useful in cleaning the getter surface itself and rendering it into a most active condition for subsequent service gettering. Excess unused $H_2$ can either be pumped away during activation or allowed to be re-gettered during the post activation cool. It is therefore within the scope of this invention to provide for a method of manufacturing getters which optionally contain a measured amount of dispensable hydrogen in the final getter form. In practice, the amount of hydrogen retained in the final getter can be adjusted easily by controlling the $H_2$ partial pressure during the sinter and post sinter cooling stages of manufacture. For applications where $H_2$ outgassing is undesirable, thorough removal of the $H_2$ can be accomplished by full vacuum sintering.

It should be noted that, optionally, it is possible to perform the hydrogen bakeout and sintering in the same step. That is, it is possible to take the hydride powder of Step 5 and proceed directly to Step 9. In that case, care must be taken to limit the heating rate during sintering so that the $H_2$ outgassing is not so rapid as to blow the powder from the molds or undesirably react with sintering furnace components, e.g. heating elements that may be subject to hydrogen embrittlement. Getter products produced by this abbreviated method tend to have higher porosity but lower bulk density than those produced by the complete process that includes the Step 6 hydrogen preremoval. Excellent gettering properties result from either version of the basic method.

This invention results in mechanically strong getter products because the invention allows use of high-Zr alloys which, because of their inherent strength and ductility, cannot be reduced easily to powder form by conventional mechanical means. Although this invention focuses on alloys primarily consisting of Zr and V, with smaller levels of additional elements such as Fe, Ni, Mn and Al, the techniques taught herein also has utility for other high-Zr getter alloys. The invention will become more clear from examples which follow, taken in conjunction with drawings which accompany this specification and form a part hereof. It is to be understood that these examples and drawings illustrate preferred embodiments of the invention and are not to be regarded as limiting, because numerous deviations from these embodiments can be made without departing from the spirit of this invention.

EXAMPLE I

Four getter alloys, with compositions as follows, were prepared in the form of 25 gram buttons by melting commercial purity elements in a nonconsumable electrode arc furnace under an argon atmosphere:

| Alloy Designation | Composition, wt. % | | | | | |
|---|---|---|---|---|---|---|
| | Zr | V | Fe | Ni | Mn | Al |
| A | 80 | 16 | 4 | — | — | — |
| B | 80 | 15 | 3.7 | 1.3 | — | — |
| C | 80 | 15 | 3.7 | — | 1.3 | — |
| D | 80 | 15 | — | 2.6 | — | 2.4 |

Figure 1:
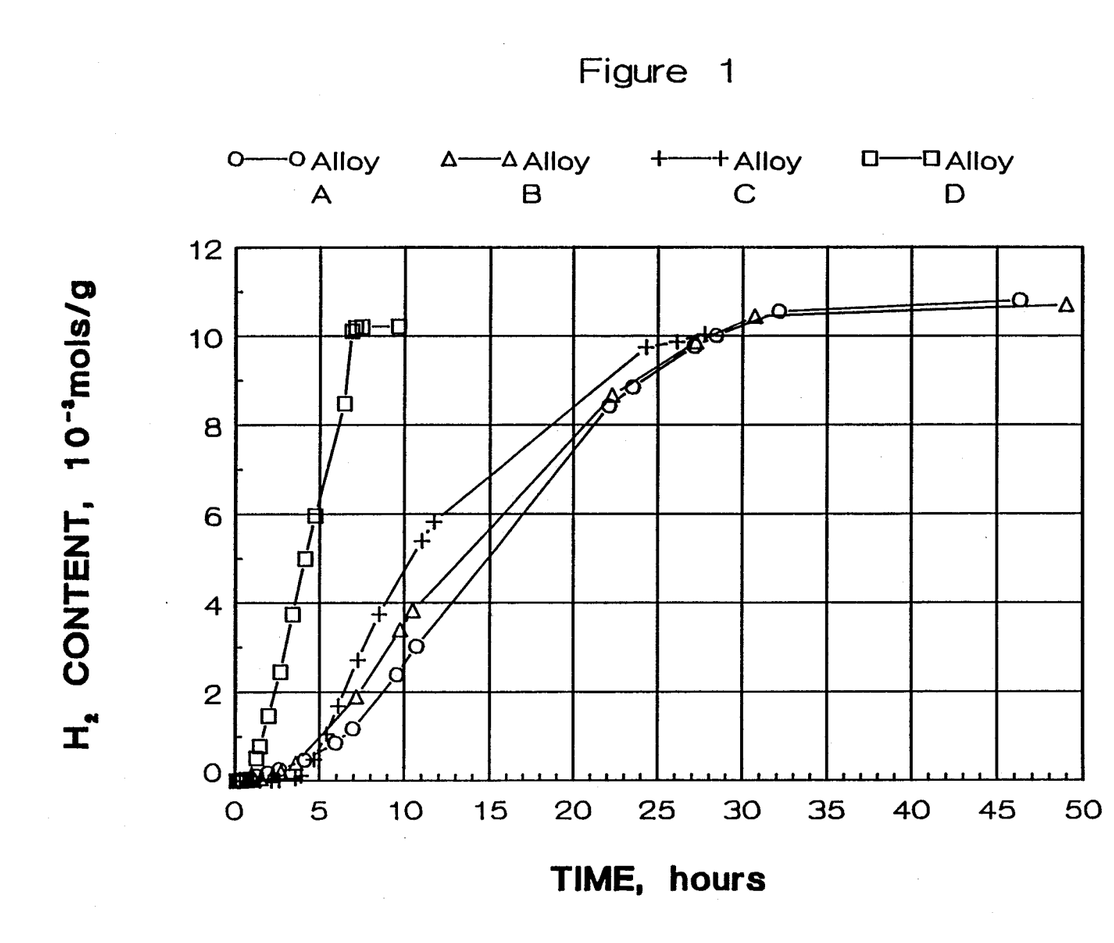
FIG. 1 contains room temperature $H_2$ absorption curves as functions of time for four getter alloy ingots of various compositions relating to this invention and obtained during hydrogen pulverization of those ingots. The related alloy compositions are tabulated in Example I.
Figure 2:
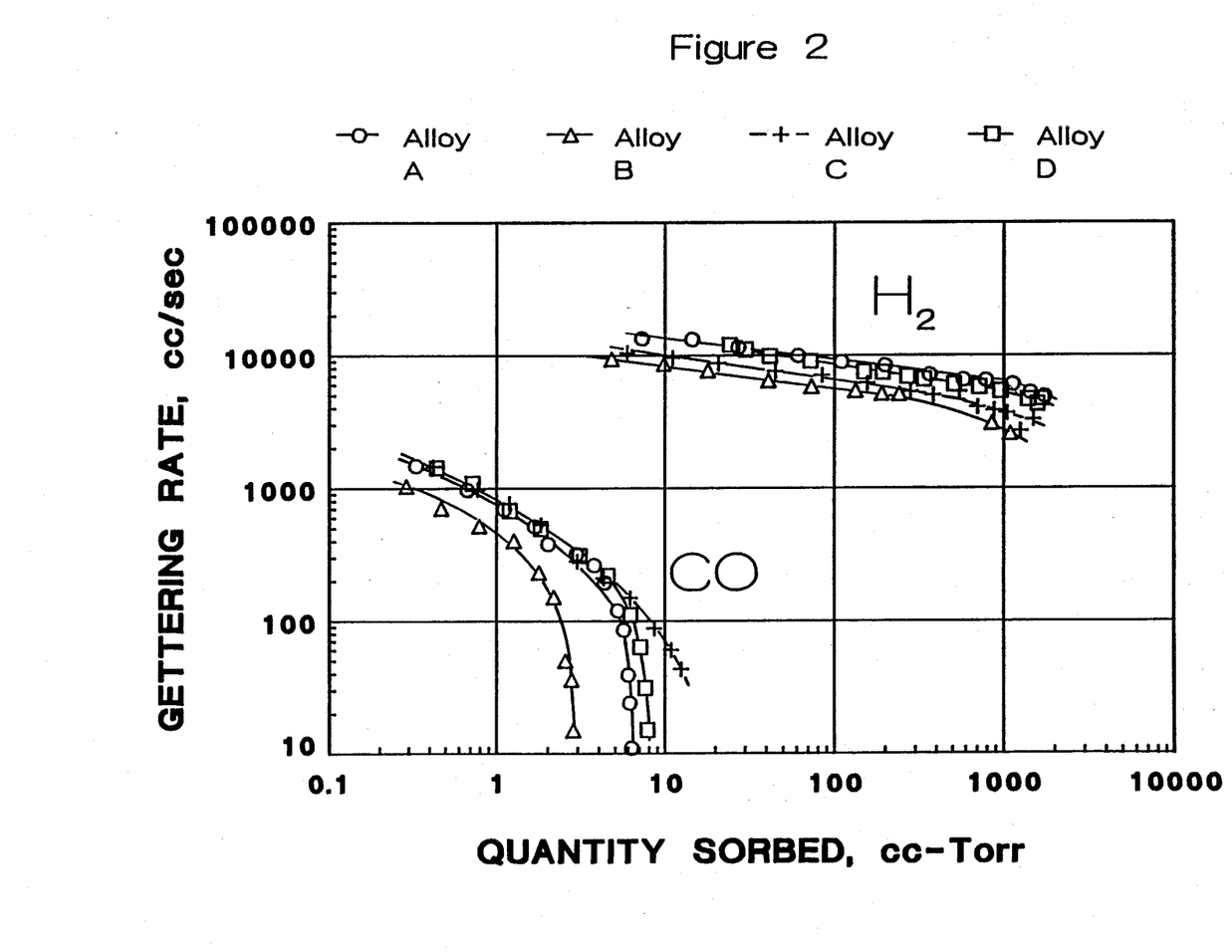
FIG. 2 contains room temperature gettering curves for CO and $H_2$ at the pressure of $3 \times 10^{-6}$ torr for four compositions related to this invention after fabrication into final porous getter form. The alloy designations are referred to in Example I.

All buttons where metallurgically tough and could not be broken with a hand hammer, i.e, were considered practically not grindable. Each button was placed individually in a small pressure vessel which was in communication with a total of about 4.1 liters free volume and a pressure measuring transducer. Using a vacuum pump, the air was evacuated to less than 25 milli-torr, the vacuum pump then valved off and $H_2$ admitted to a pressure of about 1300 torr absolute. By recording the change in pressure as a function of time, the $H_2$ absorption could be observed and plotted. The specimen reactor was maintained near room temperature with an external fan. As shown in FIG. 1, each button reacted with $H_2$ after various incubation periods and, within 28 hours or less absorbed $H_2$ to levels of at least 0.01 mols/g. By the end of each experiment the $H_2$ pressure was reduced to about 130 absolute torr. Note that the total time required for $H_2$ saturation varies from composition to composition. Quaternary additions of Ni or Mn to the Zr-V-Fe ternary beneficially accelerate $H_2$ absorption slightly. The quaternary alloy Zr-V-Al-Ni reacted the most rapidly to $H_2$. After the reactions shown in FIG. 1 were completed air stabilization was performed. Upon opening the reactor, each alloy was found to have decrepitated into powder and fine granules, a direct result of the hydrogen pulverization process. The granules were mulled lightly in ceramic mortar and pestle until all powder so produced passed through a 230 mesh (63 um) screen. These powders were then individually loaded into another reactor which was then evacuated by a vacuum pump and heated to about 800° C., during which the copious outgassing of $H_2$ became obvious by a rise in vacuum gage pressure and the sound of the vacuum pump. Pumping at 800° C. was continued for several hours until the equilibrium (blanked off) pressure was less than 1 torr at temperature. Each sample was then cooled, air stabilized, and removed from the reactor. Each sample was found to be sintered superficially into a soft lump and was mulled lightly until it again passed through a 230 mesh screen. A quantity of 450–550 mg of each powder sample then was packed around a small $Al_2O_3$-coated Mo-heater coil nested in a cored graphite mold, so as to form a hollow cylinder shape approximately 7.5 mm outside diameter $\times$ 3.5 mm inside diameter $\times$ 7 mm high. The packed molds then were placed in a vacuum furnace in loosely-fitting Zr foil boxes and subjected to a 15 minute sintering treatment at pressures less than $10^{-5}$ torr and temperatures ranging from 1050°–1150° C. depending on composition. After the sintering treatment, the samples were cooled to room temperature, removed from the vacuum furnace and removed from their individual graphite molds. Resulting were strong, porous, finished getter shapes. To evaluate the quality of each getter so produced, each was tested essentially according to the standard test technique for nonevaporable getters described in ASTM Designation F 798-82. The samples were activated under vacuum for 10 minutes at 750° C., using the embedded Mo heater, cooled to room temperature, and rate-content curves determined at a test pressure of $3 \times 10^{-6}$ torr, both for CO and $H_2$. Reactivation was performed between each gas. The data for these tests are plotted in FIG. 2. All samples showed excellent gettering properties for CO and $H_2$. In addition advantages for certain compositions can be seen. For example, Alloy C (Zr-V-Fe-Mn) showed the best capacity for CO gettering and Alloys A (Zr-V-Fe) and D (Zr-V-Al-Ni) both showed superior $H_2$ gettering speed. What is therefore shown is the ability of this family of alloys represented by the present invention to be taylored for the specific gasses expected in various gettered applications.

EXAMPLE II

Figure 3:
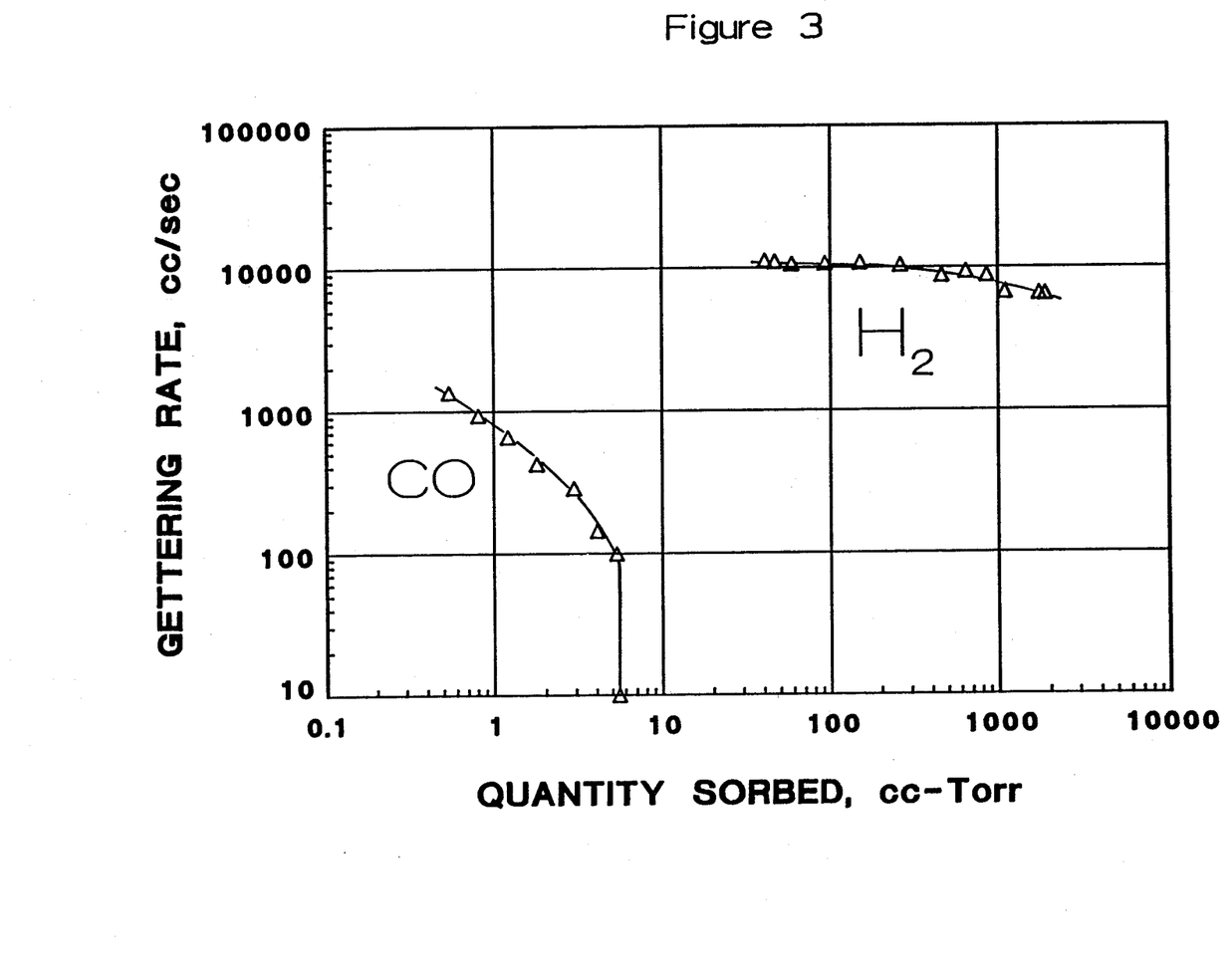
FIG. 3 contains room temperature gettering curves for CO and $H_2$ at the pressure of $3 \times 10^{-6}$ torr for the alloy, by weight, 85% Zr-10% V-2.5% Fe-2.5% Ni after fabrication into a porous getter using the method of this invention. This figure relates to Example II.

A 25-gram button of, by wt. %, 85% Zr-10% V-2.5% Fe-2.5% Ni, herein designated Alloy E, was prepared in the same manner as described in Example I and also hydrided in the same manner. After 40 hours, the sample was found to have absorbed 0.0105 mols $H_2$/gram and had decrepitated successfully into powder and small granules. Subsequent processing was performed in essentially the same manner as described in Example I to produce a Mo-heatered hollow cylinder getter form of the same dimensions. The sintering temperature was 1050° C. Getter tests were done at room temperature under the same conditions as outlined in Example 1 with the results shown in FIG. 3. These data show clearly successful application of this invention to a particularly high-Zr composition well above the Zr-level which can be ground mechanically into powder. In particular, it should be noted in comparison with Alloy B of FIG. 2 that the increased Zr- and decreased V-contents for Alloy E results in substantially improved $H_2$ gettering rates for the quaternary Zr-V-Fe-Ni quaternary system as well as improved CO gettering ability.

EXAMPLE III

Figure 4:
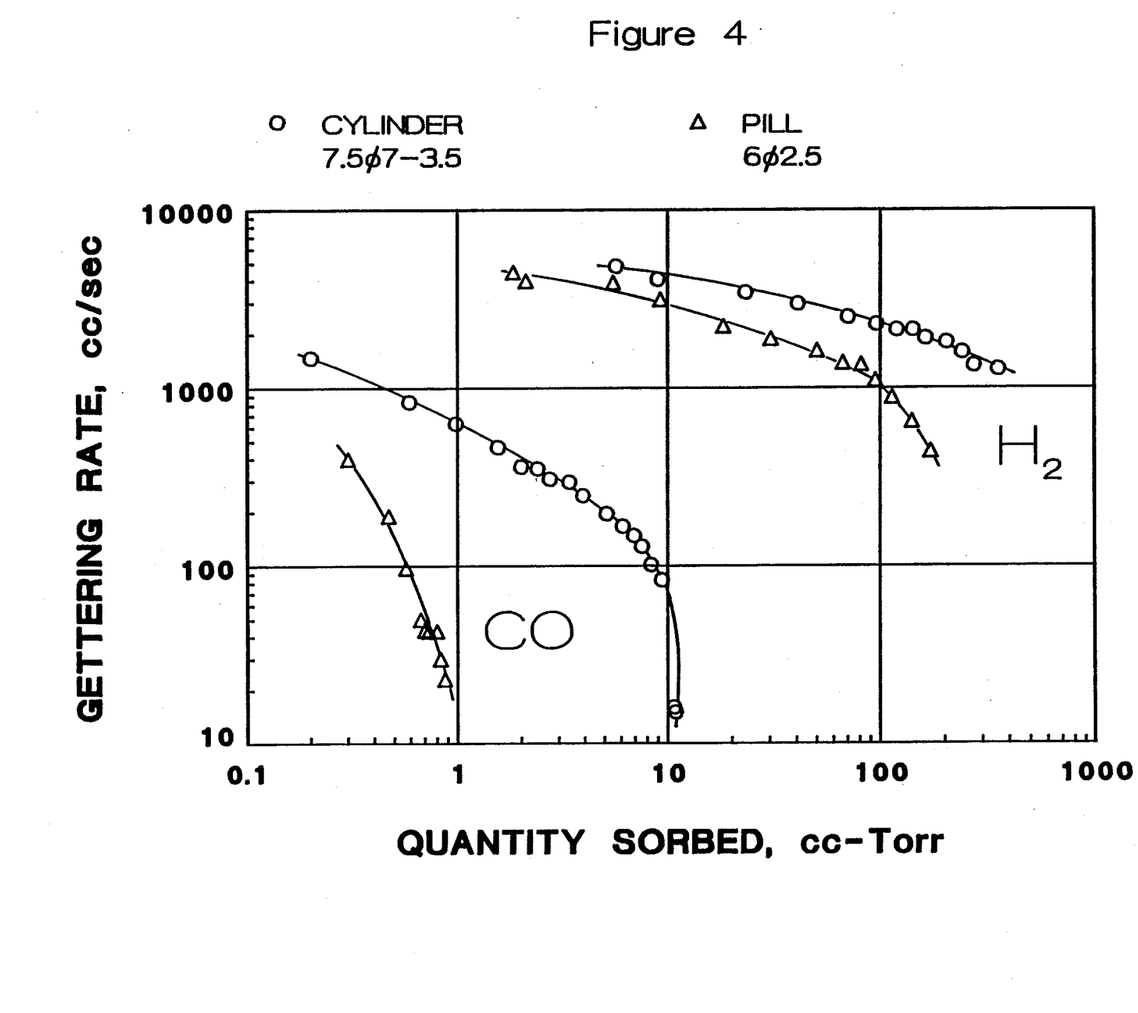
FIG. 4 contains room temperature gettering curves for CO and $H_2$ at the pressure of $3 \times 10^{-6}$ torr for two getter shapes, made from different particle sizes according to the method of this invention using the alloy, by weight, 70% Zr-25.5% V-3% Fe-1.5% Ni. This figure relates to Example III.

A 51 kilogram ingot of, by wt. %, 70% Zr-25.5% V-3% Fe-1.5Ni, herein designated Alloy F, was prepared by fabricating the commercial purity elements into a mechanically pressed electrode and melting same in a conventional consumable electrode arc furnace. This composition is of relatively low Zr-content and relatively high V-content and was found to be marginally crushale, but only with significant wear and tear on mechanical crushing equipment. The ingot was broken into fist size pieces and 3 kilograms placed in a reactor which was then evacuated of air and pressurized to an $H_2$ pressure of about 2.4 absolute atmospheres and maintained there with a pressure regulator attached to the $H_2$ supply cylinder. Within one minute hydrogen absorption began with the emission of sounds from the reactor and an increase in temperature noted. Within 10 minutes the temperature of the sample reached 550° C. a result of the heat generated by the $H_2$ absorption reaction. After about three hours, the reaction seemed to be complete with a total of 0.0105 mols $H_2$/gram absorbed. After air stabilization, the reactor was opened to reveal a well pulverized granule/powder mix. This material was mulled and screened into two size components: (A) 80 mesh (177 um) to 230 mesh (63 um) and (B) below 230 mesh. Both size fractions were then processed in the manner described in Steps 6 to 8 above to achieve dehydrided powder (some of size B was saved in hydrided form for Example IV). Some of the dehydrided powder A, in a quantity of about 300 mg, was pressed in a carbide die to form a pill about 6 mm in diameter and 2.5 mm thick. Some of the dehydrided powder B, in a quantity of about 500 mg, was molded into a Mo-heatered hollow cylinder of the identical dimensions used for Examples I and II. Both structures were sintered at 1150° C. under vacuum and tested for getter activity at $3 \times 10^{-6}$ torr CO and $H_2$ after 700°–800° C. activation according to the aforementioned ASTM Designation F 7980-82. The rate-content curves so generated are shown in FIG. 4. These data represent good properties for the respective getter products. These curves show that the present invention can be used simultaneously to produce the different particle sizes required for different final getter products. They also show the utility of this invention in manufacturing getters from alloys that are relatively low in Zr content and relatively high in V-content. However, by comparing FIG. 4 with FIGS. 2 and 3, it will be noted that the low Zr alloy F resulted in generally lower gettering rates for $H_2$ than the higher Zr alloys A to E for the comparable shape and grain size. This comparison reinforces the special utility of this invention for making the hard to grind high-Zr compositions.

EXAMPLE IV

Figure 5:
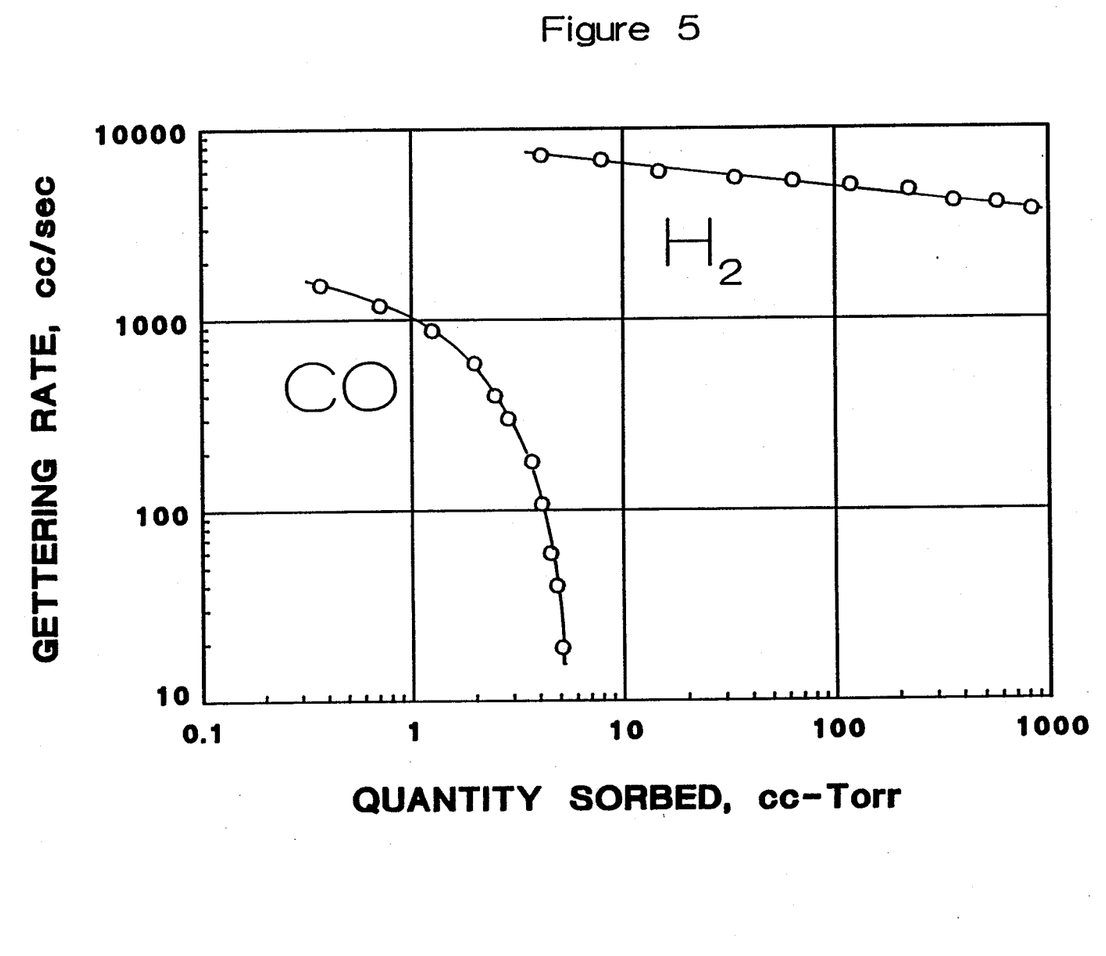
FIG. 5 contains room temperature gettering curves for CO and $H_2$ at the pressure of $3 \times 10^{-6}$ torr for a porous granular getter of composition, by weight, 70% Zr-25.5% V-3% Fe-1.5% Ni made by an abbreviated method of this invention. This figure relates to Example IV.

A portion of the Size B (minus 230 mesh) powder from Example III, in the fully hydrogen charged state (i.e. after Step 5), was poured into an inconel tray to a depth of about 4–6 cm. The tray was then placed in a horizontal tube furnace through which was started a flow of argon gas. The tray was then heated from room temperature to about 1100°–1150° C. over a period of about 2 hours and then held in that temperature range for about 2 more hours after which it was pulled to the cold zone of the furnace and allowed to cool to room temperature. Ar flow was maintained for the entire duration of heatup, hold and cool. The sample was air stabilized and examined. It was found that the annealing in flowing Ar had resulted in thorough removal of $H_2$ from the sample and also resulted in gravity sintering of the powder layer into a light, highly porous plate. In essence, the procedure of this Example should be considered an abbreviated version of the invention whereby Steps 6 to 8 inclusive are skipped. The plate produced by this abbreviated technique was then mechanically broken into a granular form of approximate size 10 mesh (2 mm) size. A 500 mg sample was tested for CO and $H_2$ gettering behavior at a pressure of $3 \times 10^{-6}$ torr after 750° C. activation according to the ASTM test procedure used in earlier examples. The resultant data are shown in FIG. 5. Clearly this abbreviated procedure resulted in a product with excellent gettering properties. In fact, the data of FIG. 5 can be directly and favorably compared with the data labelled Cylinder in FIG. 4 because both represent 500 mg samples made with minus 230 mesh powder. Such a comparison indicates that both the full and abbreviated methods of this invention can be used to fabricate excellent getters. The abbreviated method results in a getter product with higher porosity and lower mass density than the full method and the preferred use of one method over the other depends on the conditions of the application.

We claim:

1. A process for manufacturing a nonevaporable getter comprising steps as follows:
    providing a solid alloy body of Zr V and E wherein E consists of Fe Ni Mn and/or Al such that the proportions of each species are in weight percent
    E up to 7
    V from 10 to 35
    Zr balance to make 100
    introducing the body into a chamber and removing the air therefrom,
    charging the body with hydrogen for hydride formation to induce spontaneous pulverization of the body into hydride powder and/or granules, and
    removing a major portion of the hydrogen from the powder and/or granules to yield the nonevaporable getter.

2. The process of claim 1 and melting the Zr V and E in a vacuum or inert gas furnace and cooling same to form the solid alloy body.

3. The process of claim 1 with the charging step performed to a level of 0.003 to 0.012 mols/g hydrogen.

4. The process of claim 1 with the removing step performed in a dynamic vacuum or flowing inert gas medium.

5. The process of claim 4 with the removing step performed with the hydride powder and/or granules heated to a temperature range of from 700° to 1200° C.

6. The process of claim 4 and continuing the evacuation or inert gas purge until the $H_2$ partial pressure is reduced to below 1 torr absolute.

7. The process of claim 1 and mechanically grinding and screening the hydride powder and/or granules into a desired size range.

8. The process of claim 1 and mechanically grinding and screening the nonevaporable getter into a desired size range.

9. A process of manufacturing a tough porous nonevapoable getter comprising steps as follows:
    providing a solid alloy body of Zr V and E wherein E consists of Fe Ni Mn and/or Al such that the proportions of each of species are in weight percent
    E up to 7
    V from 10 to 35
    Zr balance to make 100, introducing the body into a chamber and removing the air therefrom, charging the body with hydrogen for hydride formation to induce spontaneous pulverization of the body into the hydride powder and/or granules, forming the powder and/or granules into a desired getter shape, and sintering the shape under a dynamic vacuum or flowing inert gas at a temperature in the range of 900° to 1200° C. but below its melting temperature.

10. The process of claim 9 and melting the Zr V and E in a vacuum or inert gas furnace and cooling same to form the solid alloy body.

11. The process of claim 9 with the charging step performed to a level of 0.003 to 0.012 mols/g hydrogen.

12. The process of claim 11 and mechanically grinding and screening the hydride powder and/or granules into a desired size range.

13. The process of claim 12 with the size range being less than 10 mesh.

14. The process of claim 9 and removing a major portion of hydrogen from the hydride powder and/or granules.

15. The process of claim 14 with the removing step occurring in a dynamic vacuum or flowing inert gas medium.

16. The process of claim 15 with the hydride powder and/or granules heated to a temperature range of from 700° to 850° C.

17. The process of claim 15 and continuing the evacuation or inert gas purge until the $H_2$ partial pressure is reduced to below 1 torr.

18. The process of claim 14 and mechanically grinding and screening the dehydrided powder and/or granules into a desired size range.

19. The process of claim 18 with the size range being less than 80 mesh.

20. The process of claim 9 wherein the body comprises Zr, V, Fe and Ni and the Zr content is greater than 75 wt. %.

21. The process of claim 9 wherein the body comprises Zr, V, Fe and Mn and the Zr content is greater than 75 wt. %.

22. The process of claim 9 wherein the body comprises Zr, V, Al and Ni and the Zr content is greater than 75 wt. %.

23. The process of claim 9 wherein the body comprises Zr, V, and Fe and the Zr content is greater than 75 wt. %.

24. The process of claim 12 wherein the screened powder particle size is less than 230 mesh.

25. The process of claim 9 wherein an electric heater is embedded in the getter.

26. The process of claim 9 wherein the sintering step is performed under a pressure of less than $10^{-5}$ torr and at a temperature of 900° to 1200° C. during which the getter is contained in a Zr-foil container and protected by a hydrogen atmosphere released from the getter powder.

27. The process of claim 9 wherein the sintering step is performed in an inert gas atmosphere at a temperature of 900° to 1200° C.

28. The process of claim 9 wherein 10 to 500 cc-torr of hydrogen are retained in the getter for release during getter activation.

* * * * *